(12) United States Patent
Fernandes et al.

(10) Patent No.: US 11,390,131 B2
(45) Date of Patent: Jul. 19, 2022

(54) CHASSIS ARRANGEMENT FOR A MOTOR VEHICLE, AND METHOD FOR OPERATING A MOTOR VEHICLE

(71) Applicant: BENTELER AUTOMOBILTECHNIK GMBH, Paderborn (DE)

(72) Inventors: Claudio Fernandes, Shanghai (CN); Alexandre Pinto, Shanghai (CN)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 124 days.

(21) Appl. No.: 16/808,730

(22) Filed: Mar. 4, 2020

(65) Prior Publication Data
US 2020/0282793 A1 Sep. 10, 2020

(30) Foreign Application Priority Data
Mar. 5, 2019 (DE) ...................... 10 2019 105 566.0

(51) Int. Cl.
*B60G 17/052* (2006.01)
*B60G 3/20* (2006.01)
(Continued)

(52) U.S. Cl.
CPC .............. *B60G 17/052* (2013.01); *B60G 3/20* (2013.01); *B60G 11/27* (2013.01); *B62D 17/00* (2013.01);
(Continued)

(58) Field of Classification Search
CPC ........ B60G 17/052; B60G 3/20; B60G 11/27; B60G 2200/156; B60G 2400/90;
(Continued)

(56) References Cited

U.S. PATENT DOCUMENTS 2,968,358 A * 1/1961 De Lorean ............... B60G 3/24
180/358
5,068,792 A * 11/1991 Lehr .................. B60G 17/0185
701/37
(Continued)

FOREIGN PATENT DOCUMENTS

DE 69308559 T2 7/1997
DE 19836658 A1 3/2000
(Continued)

OTHER PUBLICATIONS

Office Action for German Application No. 10 2019 105 566.0 dated Dec. 2, 2019; 8pp.
(Continued)

*Primary Examiner* — Paul N Dickson
*Assistant Examiner* — Timothy Wilhelm
(74) *Attorney, Agent, or Firm* — Hauptman Ham, LLP

(57) ABSTRACT

Chassis arrangement for a motor vehicle for passenger transportation, having two axles which are arranged at a spacing from one another in the motor vehicle longitudinal direction and in each case have wishbones with the incorporation of a spring element for the independent wheel suspension system. A first axle, lying at the front in a driving direction, is lowered from a neutral position by from 5 to 50 mm, 10 to 20 mm, in order to drive in said driving direction, and a second axle, lying at the rear in the driving direction, is raised by from 5 to 50 mm, 10 to 20 mm, in each case by way of adjustment of the spring elements, it being possible for the driving direction to be reversed.

12 Claims, 4 Drawing Sheets

(51) Int. Cl.
*B60G 11/27* (2006.01)
*B62D 17/00* (2006.01)

(52) U.S. Cl.
CPC .. *B60G 2200/156* (2013.01); *B60G 2202/152* (2013.01); *B60G 2206/124* (2013.01); *B60G 2400/0512* (2013.01); *B60G 2400/90* (2013.01); *B60G 2500/322* (2013.01); *B60G 2500/324* (2013.01)

(58) Field of Classification Search
CPC ........ B60G 2202/152; B60G 2500/322; B60G 2500/324; B60G 2400/0512; B60G 2206/124; B60G 2204/126; B60G 2202/412; B60G 2200/144; B60G 2200/4622; B60G 17/0161; B60G 2500/30; B60G 21/0553; B62D 17/00
See application file for complete search history.

(56) References Cited

U.S. PATENT DOCUMENTS

| | | | | |
|---|---|---|---|---|
| 5,398,184 A * | 3/1995 | Yamaoka | B60G 17/018 | 280/5.507 |
| 5,452,919 A | 9/1995 | Hoyle et al. | | |
| 5,601,307 A * | 2/1997 | Heyring | B60G 17/015 | 280/6.157 |
| 5,821,434 A * | 10/1998 | Halliday | B60T 8/18 | 73/862.541 |
| 6,722,994 B2 * | 4/2004 | Woods | B60G 3/18 | 180/359 |
| 6,851,510 B2 * | 2/2005 | Furumi | B62D 7/148 | 180/444 |
| 6,945,541 B2 * | 9/2005 | Brown | B60G 3/06 | 280/5.507 |
| 7,329,161 B2 * | 2/2008 | Roering | B60F 3/003 | 280/43.17 |
| 7,427,072 B2 * | 9/2008 | Brown | B60G 3/06 | 280/5.5 |
| 7,694,983 B2 * | 4/2010 | Griffiths | B60G 3/26 | 280/124.135 |
| 7,744,099 B2 * | 6/2010 | Holbrook | B60G 17/019 | 280/6.153 |
| 7,753,179 B2 * | 7/2010 | Robertson | B60G 7/02 | 188/266 |
| 7,962,261 B2 * | 6/2011 | Bushko | B60G 21/0555 | 701/37 |
| 8,285,449 B2 * | 10/2012 | Iyoda | B60G 17/0165 | 701/38 |
| 8,306,696 B2 * | 11/2012 | Holbrook | B60G 17/017 | 701/38 |
| 8,380,394 B1 * | 2/2013 | Snodgrass | B60G 17/018 | 701/37 |
| 8,480,106 B1 * | 7/2013 | Cohen | B60G 17/005 | 280/124.125 |
| 8,517,395 B2 * | 8/2013 | Knox | G01C 7/04 | 280/5.518 |
| 8,783,430 B2 * | 7/2014 | Brown | F16F 7/104 | 188/380 |
| 9,120,469 B2 * | 9/2015 | Katsuyama | B60T 8/1755 | |
| 9,205,717 B2 * | 12/2015 | Brady | B60G 17/0162 | |
| 9,272,594 B2 * | 3/2016 | McLennan | B60G 17/052 | |
| 9,321,319 B2 * | 4/2016 | Seminara | B60G 17/0565 | |
| 9,387,740 B2 * | 7/2016 | Yamada | B62D 17/00 | |
| 9,669,873 B2 * | 6/2017 | Buschjohann | B60G 7/001 | |
| 9,744,823 B2 * | 8/2017 | Drabon | B60G 3/20 | |
| 9,908,379 B2 * | 3/2018 | Guest | B60G 17/016 | |
| 10,081,224 B2 * | 9/2018 | Ohashi | B60G 17/0155 | |
| 10,403,164 B2 * | 9/2019 | Tischer | B60G 3/20 | |
| 10,442,475 B2 * | 10/2019 | Wagner | B62D 33/0604 | |
| 10,464,388 B2 * | 11/2019 | Kamiya | B60G 3/20 | |
| 10,752,074 B2 * | 8/2020 | Ohno | B60G 17/016 | |
| 10,814,746 B2 * | 10/2020 | Sailer | B60N 2/012 | |
| 10,987,987 B2 * | 4/2021 | Graus | B60G 17/06 | |
| 10,994,778 B2 * | 5/2021 | Benck | B66C 13/20 | |
| 11,046,143 B1 * | 6/2021 | Aikin | B60G 17/0195 | |
| 11,110,913 B2 * | 9/2021 | Krosschell | B60G 17/0195 | |
| 2004/0026879 A1 | 2/2004 | Schaumburg et al. | | |
| 2010/0222960 A1 * | 9/2010 | Oida | B60N 2/501 | 701/31.4 |
| 2013/0277125 A1 * | 10/2013 | Moser | B60G 17/056 | 180/9.52 |
| 2014/0265168 A1 * | 9/2014 | Giovanardi | F16K 31/12 | 280/5.5 |
| 2016/0339823 A1 * | 11/2016 | Smith | B60G 17/017 | |
| 2020/0231016 A1 * | 7/2020 | Vente | G01S 17/931 | |
| 2020/0317018 A1 * | 10/2020 | Nong | B60G 21/08 | |

FOREIGN PATENT DOCUMENTS

| | | |
|---|---|---|
| DE | 102014225928 A1 | 6/2016 |
| DE | 102015003955 A1 | 9/2016 |
| EP | 1371508 A1 | 12/2003 |

OTHER PUBLICATIONS

Office Action for German Application No. 10 2019 105 566.0 dated Oct. 29, 2021; 8pp.

* cited by examiner

CHASSIS ARRANGEMENT FOR A MOTOR VEHICLE, AND METHOD FOR OPERATING A MOTOR VEHICLE

RELATED APPLICATIONS

The present application claims priority to German Application Number 10 2019 105 566.0 filed Mar. 5, 2019, the disclosure of which is hereby incorporated by reference herein in its entirety.

FIELD

The present disclosure relates to a chassis arrangement for a motor vehicle.

Furthermore, the present disclosure relates to a method for operating the motor vehicle.

BACKGROUND

Motor vehicles for transporting persons and/or loads are known from the prior art. Motor vehicles of this type have a vehicle body and four wheels. The wheels are connected to the vehicle body via wheel suspension systems. In each case two wheels form an axle. The motor vehicles can be driven by internal combustion engines, but also by electric motors.

A motor vehicle of this type is configured by way of a vehicle body, an engine/motor usually being arranged in a vehicle front end, and a corresponding transportation compartment, for example a passenger compartment for the passenger transportation, then being arranged between two axles, and a trunk for conveying loads or further luggage items being provided at the rear. As a consequence, this results in a forward driving direction which is configured as the main driving direction. Reverse driving in the reverse driving direction is likewise possible, in order that the motor vehicle can be maneuvered or parked. The reverse driving direction is always considered merely as an auxiliary driving direction, however. The motor vehicle and the chassis of the motor vehicle are designed for the forward driving direction.

DE 10 2013 103 622 A1 has disclosed a modular axle concept, in the case of which a front axle and a rear axle are of approximately identical configuration.

SUMMARY

It is an object of the present disclosure, proceeding from the prior art, to indicate a chassis arrangement and a method for operating a motor vehicle which has identical driving properties both in the forward and the reverse driving direction.

According to the disclosure, the abovementioned object is achieved by way of a chassis suspension system.

Furthermore, a part of the object which relates to a method is achieved by way of a method for operating a motor vehicle.

The chassis arrangement for a motor vehicle for passenger transportation has two axles which are arranged at a spacing from one another in the motor vehicle longitudinal direction. On each vehicle side, the axles themselves in turn have wishbones with a wheel support arranged thereon and a wheel. The chassis arrangement provides four wheels. Each wheel is coupled via an independent wheel suspension system on the axle. The respective independent wheel suspension system is provided with incorporation of a spring element.

According to the disclosure, the chassis arrangement is then distinguished by the fact that a first axle, lying at the front in a driving direction, is lowered from a neutral position by from 5 to 50 mm, by from 10 to 20 mm, in order to drive in said driving direction. A second axle, lying at the rear in the driving direction, is raised by from 5 to 50 mm, or by from 10 to 20 mm. The lowering and raising relate to the motor vehicle vertical direction. The raising and lowering take place by way of adjustment of the spring elements. To this end, adjustable spring elements and air springs are provided. Air springs are configured by way of a bellows. In this way, the height of the air spring can be set by way of loading with air. Furthermore, a damper is provided on each wheel suspension system.

According to the disclosure, it is provided, furthermore, that the motor vehicle can drive in a second driving direction. The second driving direction is exactly opposed to the first driving direction. The axle which then lies at the front in the second driving direction is lowered by from 5 to 50 mm, or 10 to 20 mm, with respect to the original neutral position, and the axle which lies at the rear in the second driving direction is raised by from 5 to 50 mm, by from 10 to 20 mm.

By way of said feature according to the disclosure, the motor vehicle can be moved as it were in both driving directions, and in the process can realize required driving properties on account of the respective compression or rebound operation of the wheels and with regard to the driving comfort.

The chassis arrangement is suitable for autonomously driving vehicles which are used for passenger transportation. The motor vehicles can then be moved in any desired first and second driving direction which can conventionally be called the forward driving direction and the reverse driving direction, without having to be maneuvered or turned around in the process. By virtue of the fact that the driving properties are identical in the two driving directions as a result of the respective adjustment of the chassis, the motor vehicle can be moved in the two driving directions with identical driving properties.

The kinematic coupling of the wheel and/or the wheel support to the vehicle body is designed in such a way that the parameters which are to be set at the wheel, such as track, camber and caster, change in the case of raising or lowering and loading with the static wheel load.

The wheels of the raised axle are toed-in, and/or the wheels of the lowered axle are toed-out. The toe-in at the rear axle in the driving direction is from +0.02 to +0.06 degrees, or from +0.03 to +0.05 degrees. The toe-out at the front axle in the driving direction is from −0.04 to −0.08 degrees, or from −0.05 to −0.07 degrees. If the driving direction is then changed, the rear axle with toe-in becomes the front axle. At the same time, the driving direction changes, and the track is also changed automatically from toe-in into toe-out. On account of the mirrored arrangement, the same then applies to the initially front axle which becomes the rear axle. In the case of raising or lowering, the respective degree numbers can then also change in the abovementioned ranges. This means that the toe-in from +0.02 to +0.06 degrees at the rear axle automatically becomes a toe-out as a result of the change of the driving direction. The track can then be stepped up by way of the lowering of the previously rear axle and now front axle, which results in a toe-out of from −0.04 to −0.08 degrees. The actual change of the track from toe-in into toe-out takes place by way of the driving direction change, however.

The wheel suspension system itself is coupled to the vehicle body and/or an axle subframe via wishbones which are configured as double wishbones.

If an axle is raised or lowered, this means that the spring element is adjusted, and the vehicle body of the motor vehicle is therefore raised or lowered with respect to the wheels. This means a center point of a respective axle, which center point is raised or lowered, by way of adjustment of the spring elements. The motor vehicle is loaded with static wheel load, and the axle is raised or lowered by way of adjustment.

If the axle is raised in this way, the wheels of the raised axle rotate into toe-in. By way of the position of kinematic attachment points, the axle can be designed in such a way that the wheel suspension system and wheels assume the corresponding track or stay in the track when driving straight ahead.

The wheels on the front axle in the driving direction are toed-out and the wheels on the rear axle in the driving direction are toed-in. If then, according to the disclosure, the driving direction is changed and the front axle in the driving direction is lowered and the rear axle in the driving direction is raised, the track also changes.

It has been shown to be advantageous if the center point of a respective axle is also changed by way of the raising or lowering. The position of the roll center point of each axle is likewise lowered or raised itself by more than 1.1 times the lowering or raising, in relation to the motor vehicle vertical direction.

Furthermore, it has been shown to be advantageous if the wheels of the lowered axle have a positive caster angle with respect to the wheel suspension system, and/or the wheels of the raised axle have a negative caster angle. The wheels of the lowered axle have a positive toe-out angle of from 5 to 9, from 6 to 8, or from 6.5 to 7.5 degrees. The wheels of the lowered axle have a negative toe-out angle of from 5 to 9, from 6 to 8, or from 6.5 to 7.5 degrees.

Furthermore, the steering inclination axis (also called the steering rotational axis) is arranged in each case on the outside of the wheel contact area with regard to its point of intersection with the wheel contact area. This results in a negative scrub radius in the case of a raised or lowered axle. This facilitates toeing-in in the case of the application of a braking force, and likewise toeing-out in the case of an acceleration force. Toeing-in means a positive toe angle in the context of this disclosure. Toeing-out means a negative toe angle.

Furthermore, there can be a steering system on each axle. A steering rod for actuating a steering gear is arranged in the center of the axle itself.

One axle is a driven axle, and the two axles are driven axles. This means that, for example, a wheel hub motor can be arranged on each wheel. The axles can also, however, be arranged and then driven correspondingly via a transfer gearbox with associated drive shafts.

This also comprises a further advantage. The axles can be of symmetrically identical configuration. This means that the first and second axle are of identical configuration and are arranged in a symmetrically identical manner. In the case of a mirrored arrangement, the front left-hand side of the first axle becomes the rear right-hand side of the second axle, and the front right-hand side of the first axle becomes the rear left-hand side of the second axle. As a result of said arrangement, a toe-in of the right-hand rear wheel is achieved from the toe-out of the left-hand front wheel in the case of a reversal of the driving direction.

The present disclosure likewise relates to a method for operating a motor vehicle of this type with an above-described chassis arrangement.

First of all, the two axles of the motor vehicle are to be situated in the neutral position; this means, at a neutral height in the motor vehicle vertical direction. In the case of the selection of a first driving direction as a forward driving direction, the front axle in the driving direction is lowered and the rear axle in the driving direction is raised, in each case in relation to the motor vehicle vertical direction. The motor vehicle can then be moved in said forward driving direction. If the driving direction is to be changed, a second driving direction is selected as the forward driving direction. The second driving direction is selected to be exactly opposed to the first driving direction, in each case in relation to driving straight ahead. The front axle in relation to the second forward driving direction is then lowered out of the raised position as far as below the neutral position. The rear axle in the second driving direction is raised out of the lowered position, beyond the neutral position. The fact that the axles themselves are mirrored results in identical driving properties for the two driving directions.

Further advantages, features, properties and aspects of the present disclosure are the subject matter of the following description. One or more embodiments are shown in the diagrammatic figures. They serve for simple understanding of the disclosure. The same designations are used for identical or similar components, even if a repeated description is dispensed with for reasons of simplification.

BRIEF DESCRIPTION OF THE DRAWINGS

For an understanding of embodiments of the disclosure, reference is now made to the following description taken in conjunction with the accompanying drawings, in which.

DETAILED DESCRIPTION

Figure 1:
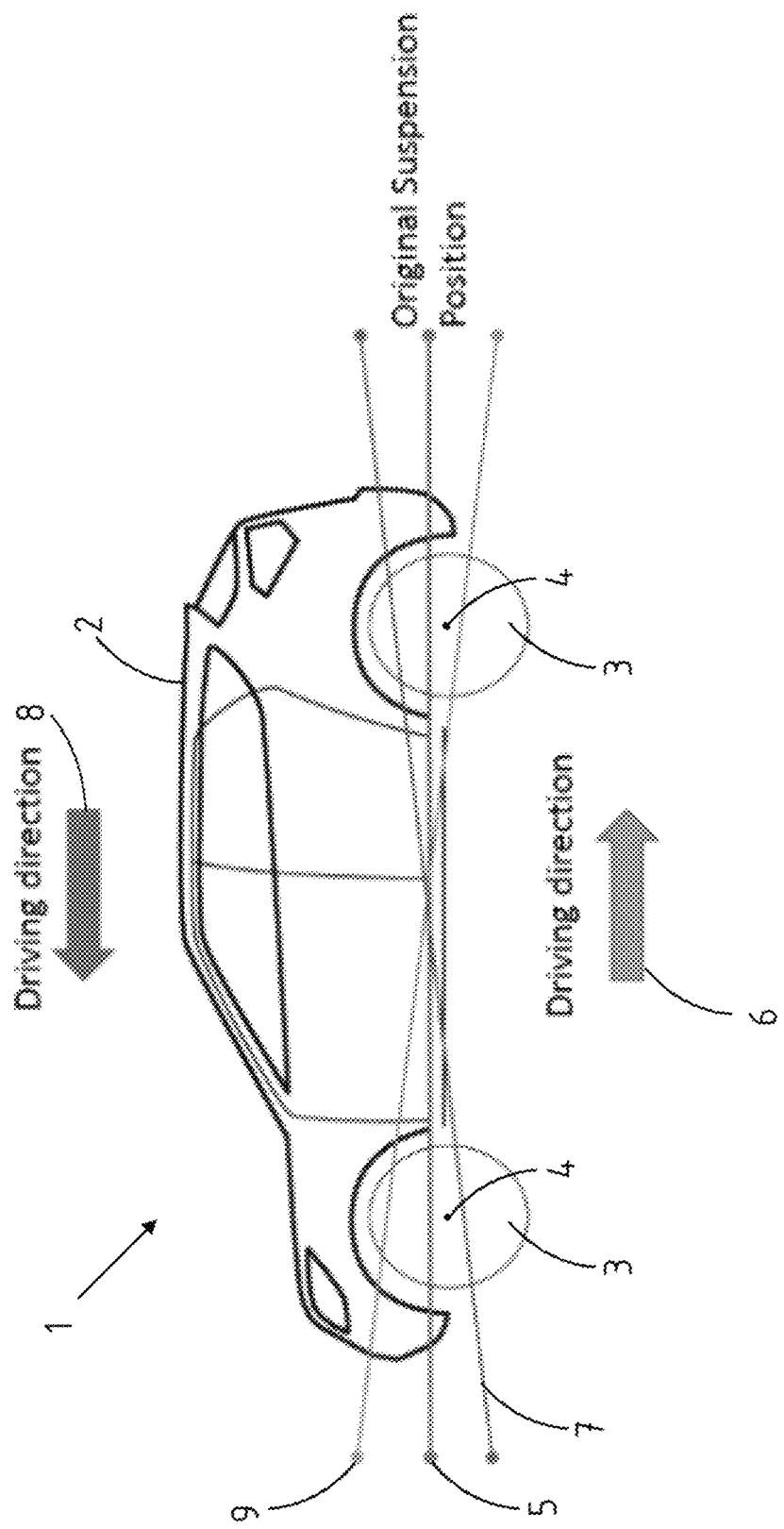
FIG. 1 shows a motor vehicle 1 having a motor vehicle body 2 and four wheels 3.

FIG. 1 shows a motor vehicle 1 having a motor vehicle body 2 and four wheels 3. Here, in each case the wheel center points 4 are illustrated by way of example for a first and a second axle. Moreover, a neutral plane 5 is illustrated, in which the motor vehicle 1 is situated in the case of non-use. If the motor vehicle 1 is then to be moved in a first driving direction 6 (to the right in the direction of the figure) and this is to represent a forward driving direction, the front axle in said driving direction 6 is lowered and the rear axle is raised in accordance with a plane 7 which is inclined toward the front.

If a second driving direction 8 which is opposed to said first driving direction 6 (to the left in the direction of the figure) is then to be selected, the motor vehicle 1 is positioned into a second inclined plane 9 in the case of a static wheel load. This takes place in such a way that the second previously rear axle is then lowered and the first previously front axle is raised.

Figure 2:
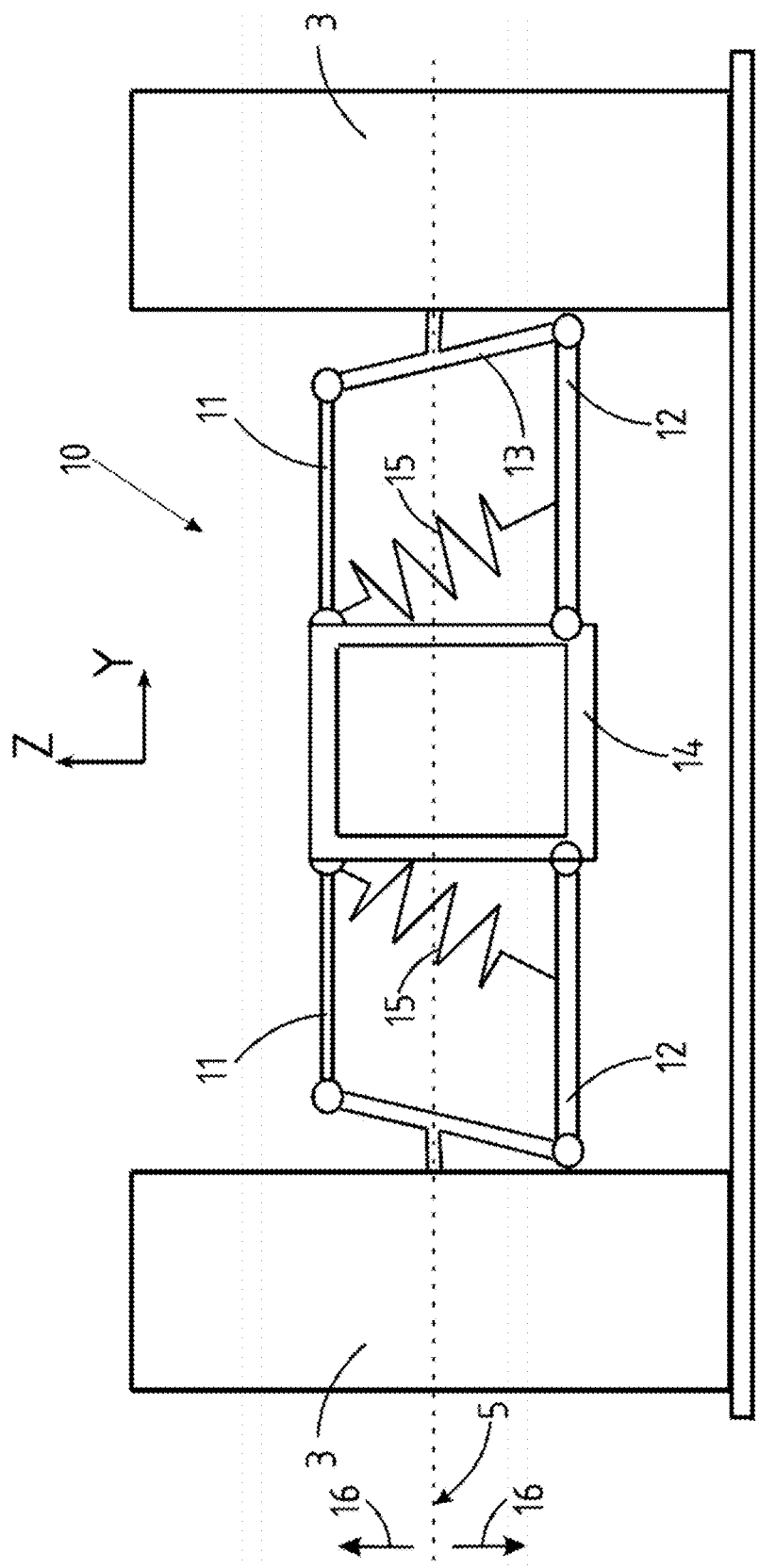
FIG. 2 shows a front view of an axle 10.

FIG. 2 shows a front view of an axle 10. The axle 10 is configured by way of an upper double wishbone 11 and a lower double wishbone 12, to which a wheel support 13 for receiving a wheel 3 is fastened. Shown in a simplified manner, the double wishbones 11, 12 are coupled to a subframe 14 or a motor vehicle body. Two spring elements 15 are arranged in each case, via which the height of the axle can be adjusted in the motor vehicle vertical direction Z, that is to say said axle can be lowered and raised. In relation to the motor vehicle vertical direction Z, the height of the axle 10 can therefore be adjusted in such a way that said axle 10 can be raised or lowered from a neutral plane 5 or neutral position in the motor vehicle vertical direction Z on the basis of the direction arrows 16.

Figure 3:
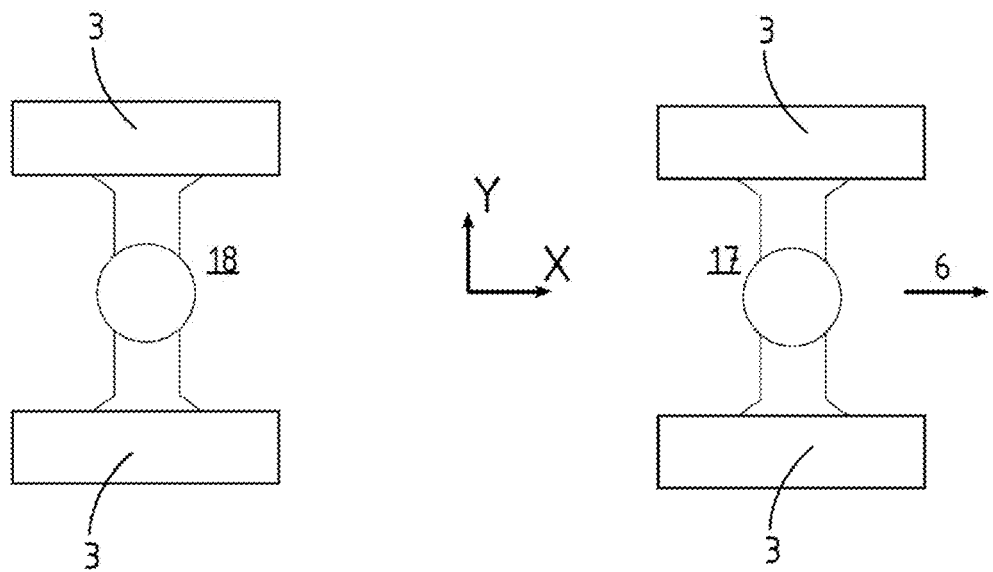
FIG. 3 shows a stylized chassis arrangement according to the disclosure in plan view.

FIG. 3 shows a stylized chassis arrangement according to the disclosure in plan view. This then shows the first driving direction 6 and a front axle 17 in the first driving direction 6 which therefore results and a rear axle 18. The axles 17, 18 are configured in the same way as the axle 10 according to FIG. 2. The motor vehicle is situated in the neutral position or neutral plane 5 according to FIG. 1. The track is also shown at the edges.

Figure 4:
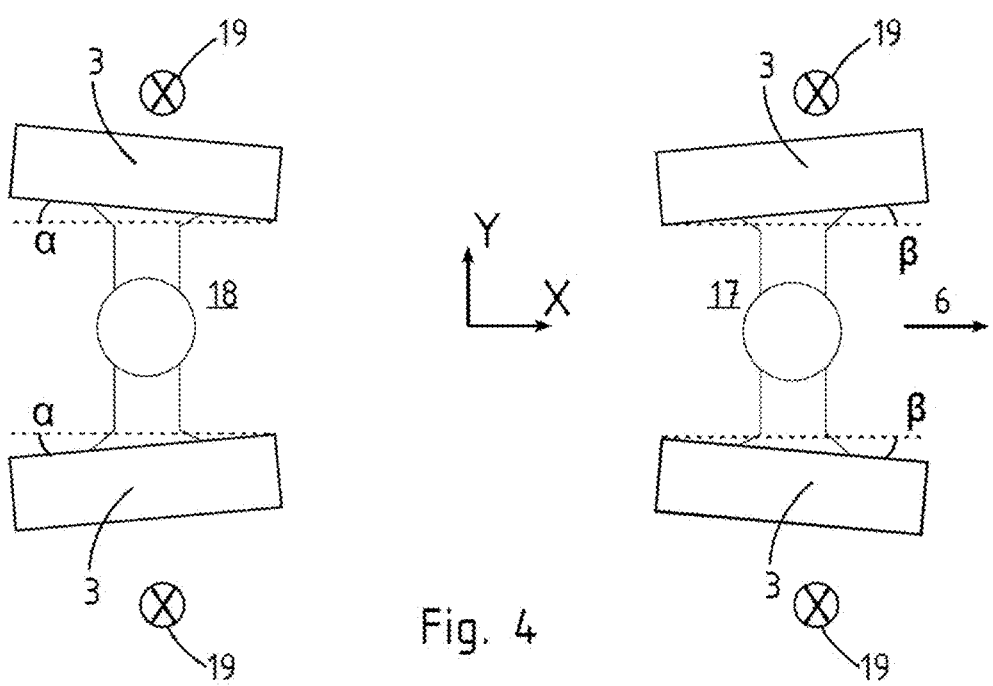
FIG. 4 shows a way the motor vehicle is to be driven in the first driving direction 6, the front axle 17 is lowered, in relation to the motor vehicle vertical direction Z, and the rear axle 18 is raised.

If the motor vehicle is then set in FIG. 4 in such a way that it is to be driven in the first driving direction 6, the front axle 17 is lowered, in relation to the motor vehicle vertical direction Z, and the rear axle 18 is raised. This leads to the wheels 3 on the front axle 17 rotating by the angle β into toe-out or being at a standstill in toe-out, and the wheels 3 on the rear axle 18 rotating by the angle α into toe-in or being at a standstill in toe-in. Furthermore, the respective intersection point 19 of the steering rotational axis on the wheel contact area is shown. Said intersection point 19 is arranged in each case outside the wheels 3. This therefore always results in a negative scrub radius.

Figure 5:
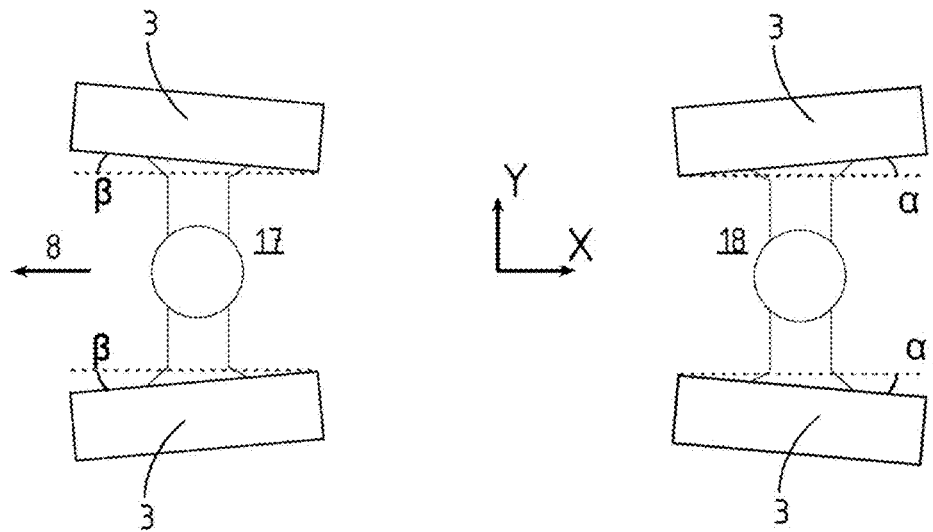
FIG. 5 shows one or more embodiments, in the case of which driving is then carried out in a second driving direction 8.

FIG. 5 shows one or more embodiments, in the case of which driving is then carried out in a second driving direction 8. The front axle 17 which previously lay on the right in relation to the plane of the figure is raised in this way and then results in a rear axle 18 on account of the driving direction. The previously rear axle 18 is lowered, and therefore results in the front axle 17 in the second driving direction 8.

Therefore, the wheels 3 of the front axle 17 are also once again toed-out and the wheels 3 of the rear axle 18 are toed-in.

Figure 6:
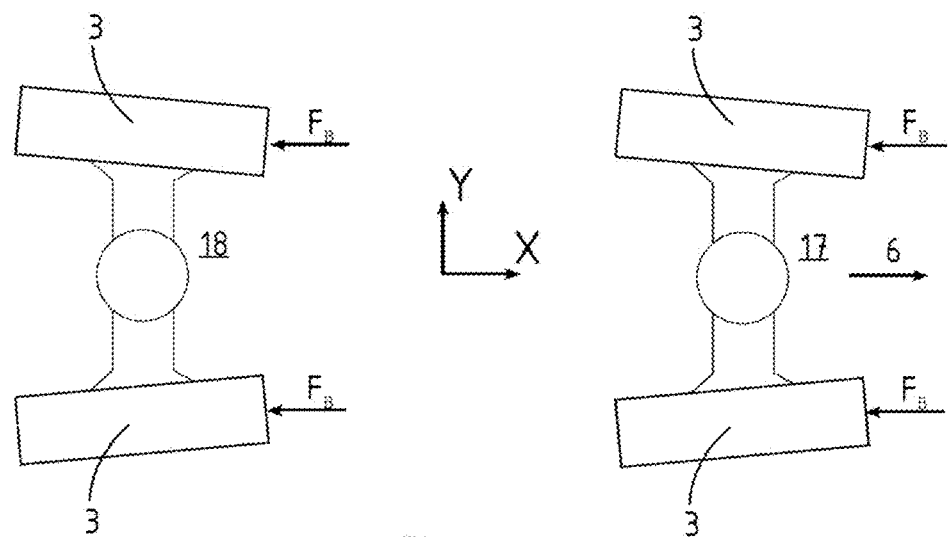
FIG. 6 shows one or more embodiments, in an analogous manner with respect to FIG. 4.

FIG. 6 shows one or more embodiments, in an analogous manner with respect to FIG. 4; in the case of a driving direction in the first driving direction 6 and in the case of loading all the wheels 3 with a braking force FB, the wheels 3 on the front axle 17 and the rear axle 18 rotate as it were with toe-in, with the result that a critical driving state is avoided if possible.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A chassis arrangement of a motor vehicle, the chassis arrangement comprising:
   first and second axles arranged at a spacing from one another in a longitudinal direction of the motor vehicle,
   each of the first and second axles comprising:
      upper and lower components coupled to a subframe, and
      spring elements between the upper and lower components,
   wherein, in order to drive in a first driving direction, the spring elements are adjustable to
      lower the first axle, lying at a front in the first driving direction, from a neutral position by a height within the range of 5 to 50 mm, and
      raise the second axle, lying at a rear in the first driving direction, from the neutral position by a height within the range of 5 to 50 mm, and
   wherein, in order to drive in a second driving direction reversed from the first driving direction, the spring elements are adjustable to
      raise the first axle from the neutral position by a height within the range of 5 to 50 mm, and
      lower the second axle from the neutral position by a height within the range of 5 to 50 mm,
   wherein, wheels coupled to the raised axle are toed-in, and wheels coupled to the lowered axle are toed-out, and
   the toed-in wheels and the toed-out wheels are coupled to the raised axle and the lowered axle, respectively, at static wheel load of the motor vehicle.

2. The chassis arrangement according to claim 1, wherein the spring elements are air springs.

3. The chassis arrangement according to claim 1, wherein each of the upper and lower components is a double wishbone.

4. The chassis arrangement according to claim 1, wherein the first axle and the second axle have a symmetrically identical configuration,
   a front left-hand wheel coupled to a left side of the first axle is mirrored by way of a rear right-hand wheel coupled to a right side of the second axle, and
   a front right-hand wheel coupled to a right side of the first axle is mirrored by way of a rear left-hand wheel coupled to a left side of the second axle.

5. The chassis arrangement according to claim 1, wherein a center point of the lowered axle is lowered by more than 1.1 times the lowering of the lowered axle, or
   a center point of the raised axle is raised by more than 1.1 times the raising of the raised axle.

6. The chassis arrangement according to claim 1, wherein wheels coupled to the lowered axle have a positive caster angle, and
   wheels coupled to the raised axle have a negative caster angle.

7. The chassis arrangement according to claim 1, wherein the upper and lower components are arranged at a center of said each of the first and second axles.

8. The chassis arrangement according to claim 1, wherein one of the first and second axles is a driven axle.

9. The chassis arrangement according to claim 1, wherein in order to drive in the first driving direction, the spring elements are adjustable to
   lower the first axle from the neutral position by a height within the range of 10 to 20 mm, and
   raise the second axle from the neutral position by a height within the range of 10 to 20 mm.

10. The chassis arrangement according to claim 1, wherein
in order to drive in the second driving direction, the spring elements are adjustable to
raise the first axle from the neutral position by a height within the range of 10 to 20 mm, and
lower the second axle from the neutral position by a height within the range of 10 to 20 mm.

11. The chassis arrangement according to claim 1, wherein both of the first and second axles are driven axles.

12. A method of operating the motor vehicle with the chassis arrangement according to claim 1, comprising:
when the first and second axles of the motor vehicle are situated in a neutral position,
selecting the first driving direction as a forward driving direction, by lowering the first axle and raising the second axle, and
selecting the second driving direction as the forward driving direction, by raising the first axle and lowering the second axle.

\* \* \* \* \*